United States Patent
Sasaki et al.

(10) Patent No.: US 8,089,176 B2
(45) Date of Patent: Jan. 3, 2012

(54) COMMUNICATION SYSTEM AND COMMUNICATION APPARATUS

(75) Inventors: Kazuji Sasaki, Kanagawa (JP); Takehiro Sugita, Kanagawa (JP); Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/333,068

(22) Filed: Dec. 11, 2008

(65) Prior Publication Data

US 2009/0175321 A1    Jul. 9, 2009

(30) Foreign Application Priority Data

Jan. 8, 2008   (JP) .................. 2008-000954

(51) Int. Cl.
*H02J 1/00* (2006.01)
*H02J 3/00* (2006.01)
*H04B 3/54* (2006.01)

(52) U.S. Cl. .................. 307/1; 307/DIG. 1; 307/3
(58) Field of Classification Search .............. 307/1, 3, 307/DIG. 1; 340/310.11, 310.12, 310.18
See application file for complete search history.

(56) References Cited

U.S. PATENT DOCUMENTS

| 2005/0180561 A1 | 8/2005 | Hazani et al. |
| 2007/0220570 A1 | 9/2007 | Dawson et al. |

FOREIGN PATENT DOCUMENTS

JP    2005-143026    6/2005

*Primary Examiner* — Jared Fureman
*Assistant Examiner* — Carlos Amaya
(74) *Attorney, Agent, or Firm* — Robert J. Depke; Rockey, Depke & Lyons, LLC

(57) ABSTRACT

Disclosed herein is a communication system including: at least one power line communication apparatus connected via a general power line for supplying a commercial alternate current power; a communication terminal having a modem for power line communication, and a plurality of first coils having different directivities; and a coupling apparatus, connected to a power line, having a filter for attenuating an alternate current component of the power line, and a second coil arranged after the filter; wherein the communication terminal executes mutual communication with any of the power line communication apparatus connected via the general power line through proximity communication based on an electromagnetic coupling action that is generated between the plurality of first coils and the second coil when the communication terminal is brought to the proximity of a coupling surface of the coupling apparatus.

16 Claims, 12 Drawing Sheets

COMMUNICATION SYSTEM AND COMMUNICATION APPARATUS

CROSS REFERENCES TO RELATED APPLICATIONS

The present invention contains subject matter related to Japanese Patent Application JP 2008-000954 filed in the Japan Patent Office on Jan. 8, 2008, the entire contents of which being incorporated herein by reference.

BACKGROUND OF THE INVENTION

1. Field of the Invention

The present invention relates to a communication system and a communication apparatus that are configured to be connected to a general electric receptacle and for power line communication and, more particularly, to a communication system and a communication apparatus that are configured for such mobile devices operating not on commercial AC (Alternative Current) power supplies as PDAs (Personal Digital Assistants) and mobile phones to execute power line communication.

2. Description of the Related Art

Recently, as means for building a LAN (Local Area Network) in a simple manner in buildings such as homes, PLC (Power Line Communication) has been put into practice that a device having communication capabilities and supplied with an electric power through a power line multiplexes a communication signal with a the power line to communicate with other devices having the similar capabilities through the power line.

Although the wireless LAN has been widely spreading as means for building LANs in a simplified manner, the wireless LAN presents problems of the difficulties in room-to-room communication caused by the poor wall-barrier surpassing characteristic due to the restricted transmission output power to avoid interference with various radio-associated regulations and other systems. In contrast, with the power line communication, use of existing power lines allows communication between devices installed in different rooms having AC receptacles, thereby makes ignorable the locations of mate devices. The power line communication allows to build a LAN without arranging Ethernet (registered trademark) in a building and can realize the high-speed communication of 100 Mbps or higher.

Referring to FIG. 12, there is shown a home network system based on a related-art PLC. In the figure, reference numeral 100 denotes a household power line, reference numerals 101 and 106 denote household receptacles, reference numerals 102 and 107 denote AC plugs, reference numerals 103 and 108 denote PLC modems (the PLC modem 103 being the master), reference numeral 109 denotes a host device such as a personal computer, reference numeral 104 denotes an optical line terminator device, and reference numeral 105 denotes the Internet. Reference numeral 104 may denote an ADSL (Asymmetric Digital Subscriber Line) modem.

The PLC modem 103 and the PLC modem 108 communicate with each other via the power line 100, allowing the PC (Personal Computer) 109 to be connected to the Internet 105 via the optical line terminator device 104.

A communication system based on the power line communication can realize a so-called ubiquitous environment that allows the use of the capabilities of computers having similar performance wherever users move. For example, a system is proposed in which power line communication capabilities are given to each kind of household devices such as household appliances, the household devices are monitored and controlled by a master device based on a PC for example, and the master device is accessed through an external public communication network for externally monitoring and controlling the household devices (refer to Japanese Patent Laid-Open No. 2005-143026 for example).

Because the transmission route of PLC is a power line, the network configuration is of bus type in the case of existing wiring, in which all communication devices in home that are connected to the power line are shared in band on a time division basis. In the system configuration shown in FIG. 12, there are two PLC modems; thus it practicable to arrange a plurality of modems for mutual communication.

As seen from FIG. 12, a related-art power line communication system is basically used by devices, such as desktop PCs, that are each mainly powered by a commercial AC power supply and have an AC plug that can be inserted in an AC receptacle. In other words, if mobile devices, such as PDAs (Personal Digital Assistants) and mobile phones, are in a battery driven state in which a commercial AC power supply is not used, these mobile devices cannot execute power line communication. In this case, it is required for a mobile device having wireless LAN capabilities to be connected to PLC via an access point or for a mobile device to be connected to an AC receptacle via a PLC modem or an AC adaptor.

SUMMARY OF THE INVENTION

Therefore, the present invention addresses the above-identified and other problems associated with related-art methods and apparatuses and solves the addressed problems by providing a communication system and a communication apparatus configured to be connected to a general-purpose receptacle to execute power line communication.

Further, the present invention addresses the above-identified and other problems associated with related-art methods and apparatuses and solves the addressed problems by providing a communication system and a communication apparatus configured to enable mobile devices such as PDAs and mobile phones that operate without using a commercial AC power supply to execute power line communication.

Still further, the present invention addresses the above-identified and other problems associated with related-art methods and apparatuses and solves the addressed problems by providing a communication system and a communication apparatus configured to, when mobile devices such as PDAs and mobile phones that operate without using a commercial power supply execute power line communication, minimize the lowering of communication performance and enhance the degree of freedom in arranging mobile devices.

In carrying out the invention and according to a first embodiment thereof, there is provided a communication system. This communication system is made up of at least one power line communication apparatus connected via a general power line for supplying a commercial alternate current power; a communication terminal having a modem for power line communication and a plurality of first coils having different directivities; and a coupling apparatus, connected to a power line, having a filter for attenuating an alternate current component of the power line and a second coil arranged after the filter; wherein the communication terminal executes mutual communication with any of the power line communication apparatus connected via the general power line through proximity communication based on an electromagnetic coupling action that is generated between the plurality of first coils and the second coil when the communication terminal is brought to the proximity of a coupling surface of the coupling apparatus.

Term "system" herein denotes an entity made up of a logical collection of two or more apparatuses (or two or more functional modules for realizing a particular function), in which these apparatuses or functional modules may be collectively arranged in a single housing or separately arranged in different housings.

Power line communication technologies are actually practiced as means for building a LAN in a premise such as a home in a simplified manner, by which communication between devices arranged in rooms can be executed as long as these rooms have AC receptacles, at communication speeds as fast as 100 Mbps.

However, related-art power line communication systems basically are used by such devices as desktop PCs having AC plugs to AC receptacles, of which main drive power is based on commercial AC powers. Therefore, for mobile devices such as PDAs and mobile phones that do not use commercial AC powers, related-art power line communication systems are not convenient.

By contrast, with a communication system according to an embodiment of the present invention, a coupling apparatus is connected to a power line. This coupling apparatus has a filter for attenuating the alternate current component of the power line and a coil, arranged after this coil, for electromagnetic coupling with a coil of a mobile device. The mobile device has a modem for power line communication and the coil for transferring power line communication signals with the outside by electromagnetic coupling. Proximity communication based on the electromagnetic coupling with the coil of the coupling apparatus increases the degree of freedom in the arrangement of the mobile device, thereby facilitating the participation of the mobile device in a power line communication group.

It should be noted here that the directivity of coils presents a problem of the limited degree of freedom in installation space. Namely, in the proximity of the center of the coil of the coupling apparatus, a magnetic field is generated in the direction approximately vertical to coil section; however, in the proximity of the coil wire, a magnetic field is generated that depends on the direction of the current flowing according to the so-called right-handed screw rule. Therefore, the strength of electromagnetic coupling with the coil of the mobile device depends on the location of the mobile device on the coupling apparatus, thereby causing deterioration in communication quality.

So, in order to prevent the above-mentioned problem of the deterioration in communication quality, each mobile device according to an embodiment of the present invention uses two or more coupling coils having different winding directions (namely, directivities) and, when executing communication by bringing the mobile device to the proximity of the coupling device, any one of the coils that is highest in the strength of electromagnetic coupling with the coil of the coupling device and highest in communication speed is selected.

To be more specific, in starting communication with any of power line communication apparatuses connected to a general power line via a coupling apparatus, each mobile device according to the invention switches between two or more first coils to obtain a reception speed at which a signal is received by each of the coils, thereby selecting one that is highest in reception speed.

Alternatively, in starting communication with any of the power line apparatus connected via a general power line, the mobile device according to an embodiment of the invention switches between two or more first coils to execute a scan operation for obtaining a reception speed at which a signal is received by each coil and selects any one coil that is highest in reception speed and this reception speed exceeds a predetermined speed. During communication, when the reception speed of the selected coil is equal to or below the predetermined speed, executes the scan operation again, thereby selecting any one coil that is highest in reception speed and exceeds the predetermined speed. Consequently, the communication quality can be maintained at higher than a certain level over the entire communication period.

If the coil switching is executed during transmission or reception, the communication is interrupted. To prevent this situation, the mobile device according to an embodiment of the invention switches between coils in an interval where transmission is switched to reception.

It should be noted that the mobile device according to an embodiment of the invention identifies the reception speed on the basis of at least one of reception signal strength for automatic gain control (AGC), bit error ratio (BER), and reception quality that are obtained in baseband processing of a reception signal of the first coil. For example, with communication systems based on OFDM (Orthogonal Frequency Division Multiplex) modulating, a pilot signal that is inserted between information signals can be used to measure the reception speed.

As described above and according to an embodiment of the invention, a communication system and a communication apparatus that are configured to execute power line communication by use of general power receptacles.

According to an embodiment of the invention, mobile devices such as PDAs and mobile phones can directly participate in a network based on PLC. Also, these mobile devices can execute communication by means of PLC even in an area outside of a wireless LAN.

With the communication system according to an embodiment of the invention, each mobile device has a coil for electromagnetic coupling with a power line communication modem that enables the mobile device to participate in a power line communication group by the proximity communication with the coil on the coupling apparatus side on the basis of electromagnetic coupling.

Generally, the directivity of coils restricts the space of mobile device installation. However, with embodiments of the present invention, each mobile device has two or more coils having different winding directions (namely, directivities) and any one of these coils that is highest in the strength of electromagnetic coupling with the coil of the coupling apparatus side and highest in communication speed is selected, thereby preventing the quality of communication from deterioration.

Many other features and advantages of the present invention will become manifest to those versed in the art upon making reference to the detailed description which follows and the accompanying sheet of drawings.

DETAILED DESCRIPTION OF THE PREFERRED EMBODIMENTS

This invention will be described in further detail by way of embodiments thereof with reference to the accompanying drawings.

Figure 1:
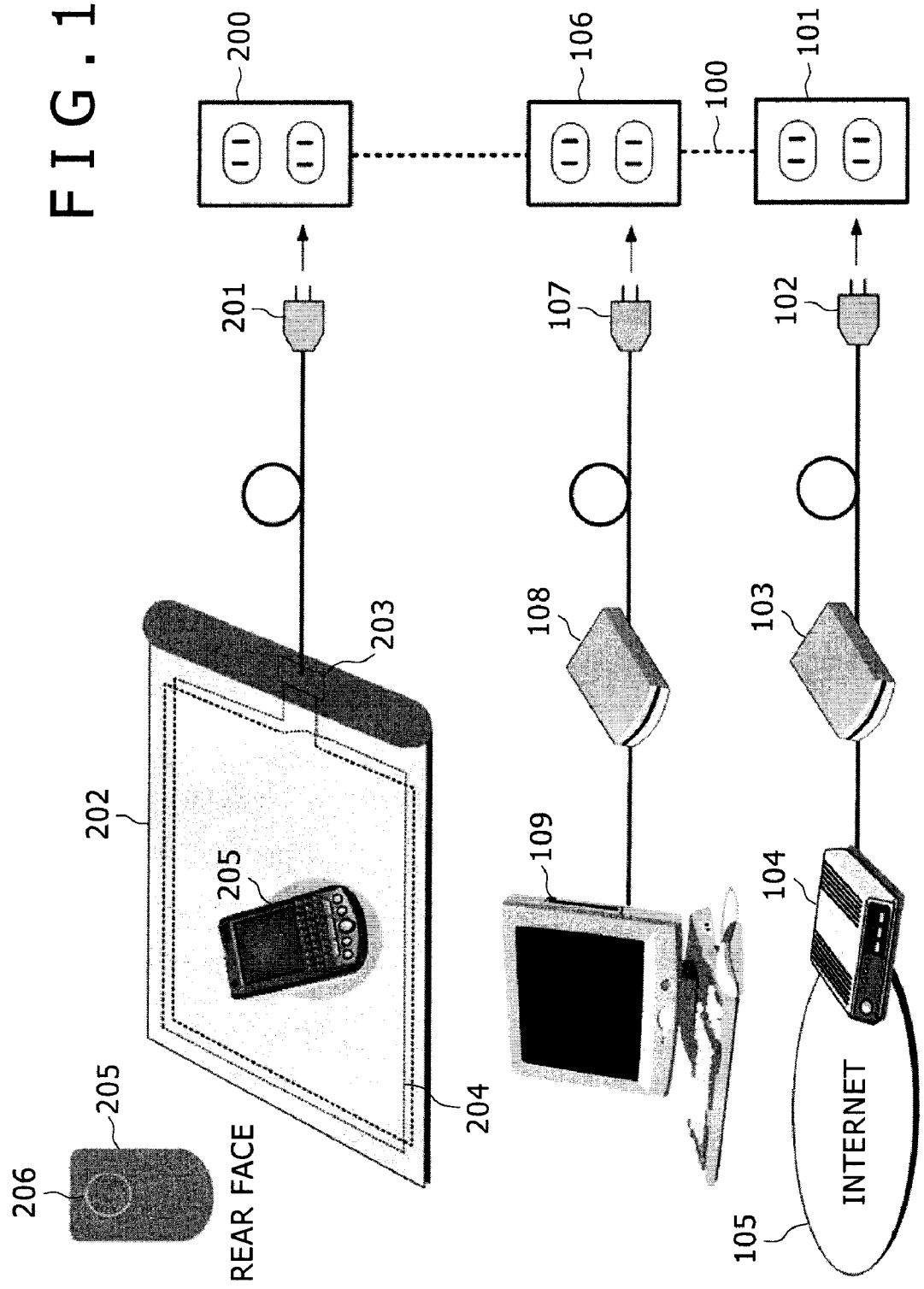
FIG. 1 is a schematic diagram illustrating a configuration of a household network system practiced as one embodiment of the invention.

Now, referring to FIG. 1, there is schematically shown a configuration of a household network system by way of example.

Figure 12:
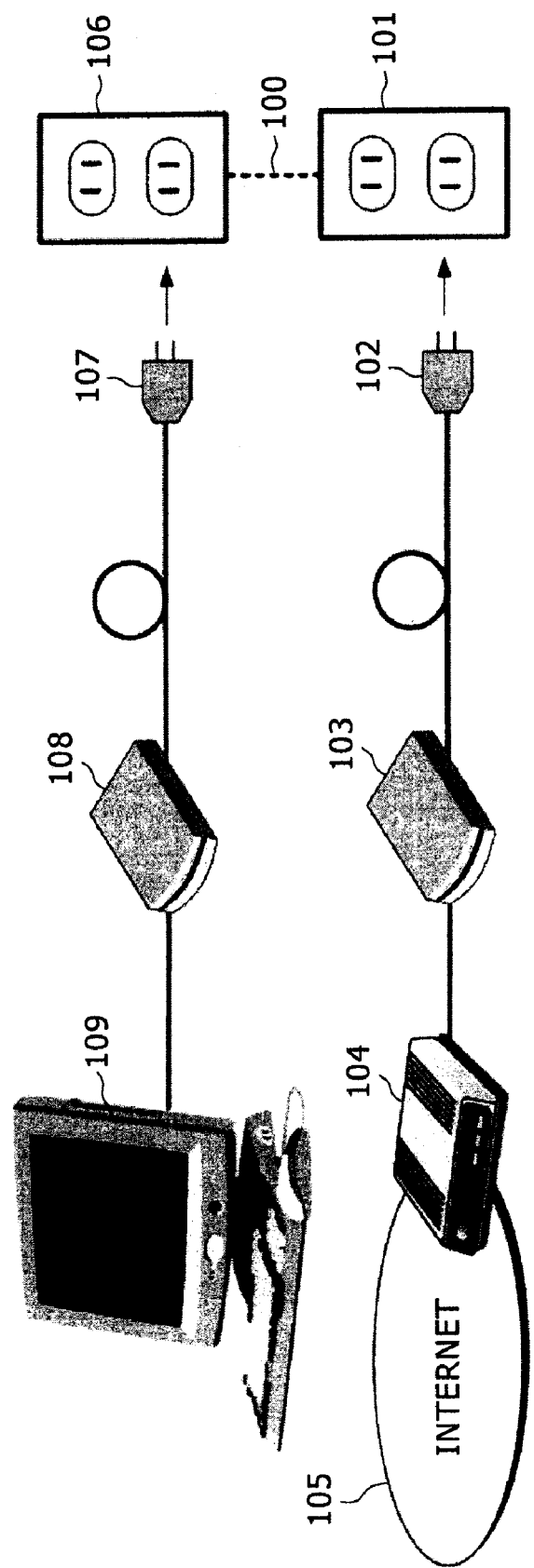
FIG. 12 is a diagram illustrating a household network system based on a related-art PLC.

The system shown in FIG. 1 is substantially the same as the system shown in FIG. 12 in that a personal computer 109 is participating in a household PLC network in which a power line 100 is laid in a home and an AC plug 107 at one end of a power supply cable of a PLC modem 108 connected to the personal computer 109 is plugged in a household receptacle 106 and the household PLC network and the Internet 105 are interconnected by plugging an AC plug 102 at one end of a power supply cable of a PLC modem 103 connected to an optical line terminator device (or an ADSL modem for example) for connection to an external network 105 such as the Internet is plugged in a household receptacle 101.

Main differences of the system shown in FIG. 1 and the related-art system shown in FIG. 12 lie in that a PDA 205 is added to the PLC network as a communication device.

The PDA 205 is not a device that operates on a commercial AC power supply, so that the PDA 205 cannot participate in a PLC network by plugging an AC plug into an AC receptacle. Hence, the PDA 205 is configured to incorporate a coil (to be described later) for transferring signals with a power line communicating modem by electromagnetic coupling, thereby participating in a PLC network by the electromagnetic coupling with an electromagnetic coupling sheet 202. The electromagnetic coupling sheet 202 has a filter for attenuating the AC component of a power line and a coil for electromagnetic coupling connected after this filter (to be described later). So, when the coil in the PDA 205 approaches this coil, an electromagnetic coupling action occurs between the coils, there by enabling the PDA 205 to transfer a PLC signal. Because the band for use in power line communication is 2 to 30 MHz for example, a wide band electromagnetic coupling that covers this frequency band is demanded.

Figure 2:
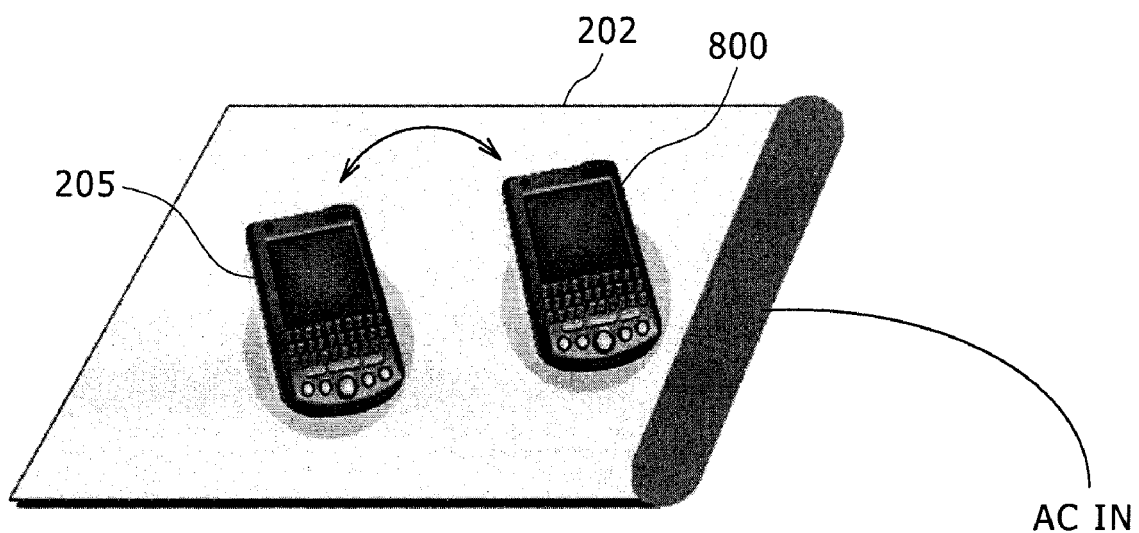
FIG. 2 is a diagram illustrating a manner in which mutual communication is executed between mobile devices on an electromagnetic coupling sheet without using a power line communication route.

The PDA 205 is used as arranged on the electromagnetic coupling sheet 202. The number of mobile devices arranged on the electromagnetic coupling sheet 202 is not limited to one unit; two or more mobile devices can be put on the electromagnetic coupling sheet 202 according to the size thereof, each of these mobile devices being capable of communicating with a different PLC modem. In addition, as shown in FIG. 2, communication between two or more mobile devices can be executed through the electromagnetic coupling sheet 202.

The electromagnetic coupling sheet 202 has a highpass filter (HPF) 203 for cutting (or attenuating) the AC component (50 Hz to 60 Hz) from he AC line and a coil 204 for providing electromagnetic induction with a coil on the mobile device side.

Therefore, the PDA 205 that is a mobile device is capable of communication based on a PLC signal via the electromagnetic coupling sheet 202, the power line 100, the PLC modem 103, and the PLC modem 108. In addition, the PDA 205 is capable of connecting to the Internet 105 via the optical line terminator device 104 and communicating with the personal computer 109 participating in the PLC network.

It should be noted that, in the above description, the coupling is provided by the magnetic field between the mobile device and the electromagnetic coupling sheet; however, there is a possibility that an electric field is acting in no small measure, so that the gist of the present embodiment is not always limited to electromagnetic coupling.

Figure 3:
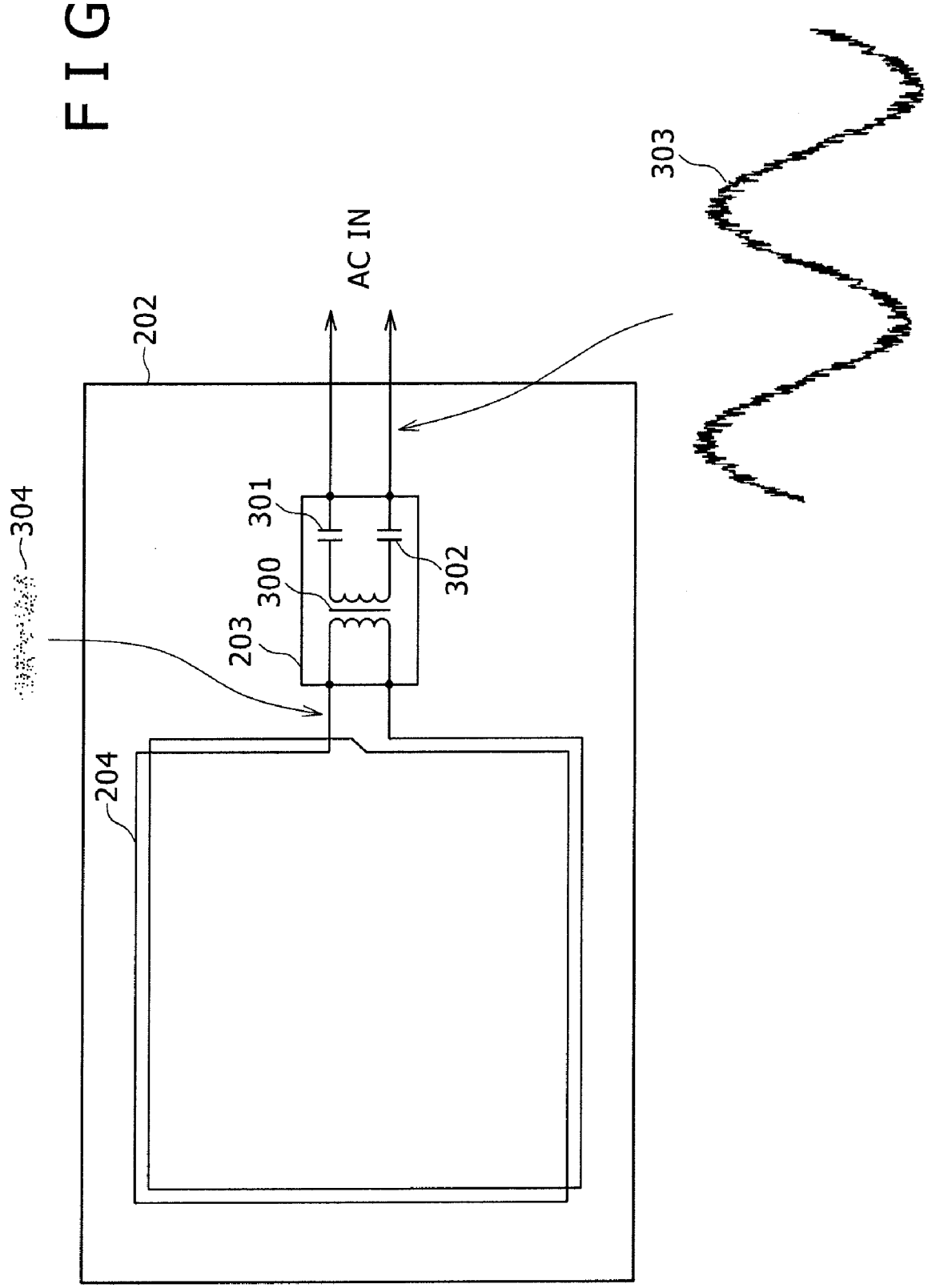
FIG. 3 is a schematic diagram illustrating an internal configuration of the electromagnetic coupling sheet.

Referring to FIG. 3, there is shown an exemplary internal configuration of the electromagnetic coupling sheet 202. Reference numeral 203 denotes a highpass filter and reference numeral 204 denotes a coil. The highpass filter 203 is made up of a transformer 300 and two capacitors 301, 302, thereby forming a highpass filter with input/output being of balance type. The capacitors 301, 302 are connected at one end to the power line 100.

For PLC modulating, OFDM (Orthogonal Frequency Division Multiplex) is often used. In OFDM modulating, the frequency of each carrier is set such that sub carriers orthogonally cross each other in a symbol interval. The "orthogonal crossing" of sub carriers denotes that the peak point of the spectrum of a given sub carrier always match the zero point of the spectrum of another sub carrier and there occurs no cross talk when band of adjacent sub carriers are put in proximity almost to overlapping each other. Therefore, because transmission data is transmitted by dividing into a plurality of carriers in which the frequencies orthogonally cross each other, the band of each carrier becomes narrow, thereby providing a very high frequency usage efficiency.

Reference numeral 303 in the figure denotes a waveform of a PLC signal transmitted from the power line 100. It should be noted that an OFDM signal is multiplexed with an AC signal. When this signal passes the highpass filter 203, the AC component of 50 to 60 Hz is cut to provide a single OFDM signal as denoted by reference numeral 304. An OFDM signal from the electromagnetic coupling sheet 202 (namely, a transmission signal from the PDA 205) passes the highpass filter 203 in the reverse route to be multiplexed with an AC signal to be transmitted to a PLC modem of the mate side.

Figure 4:
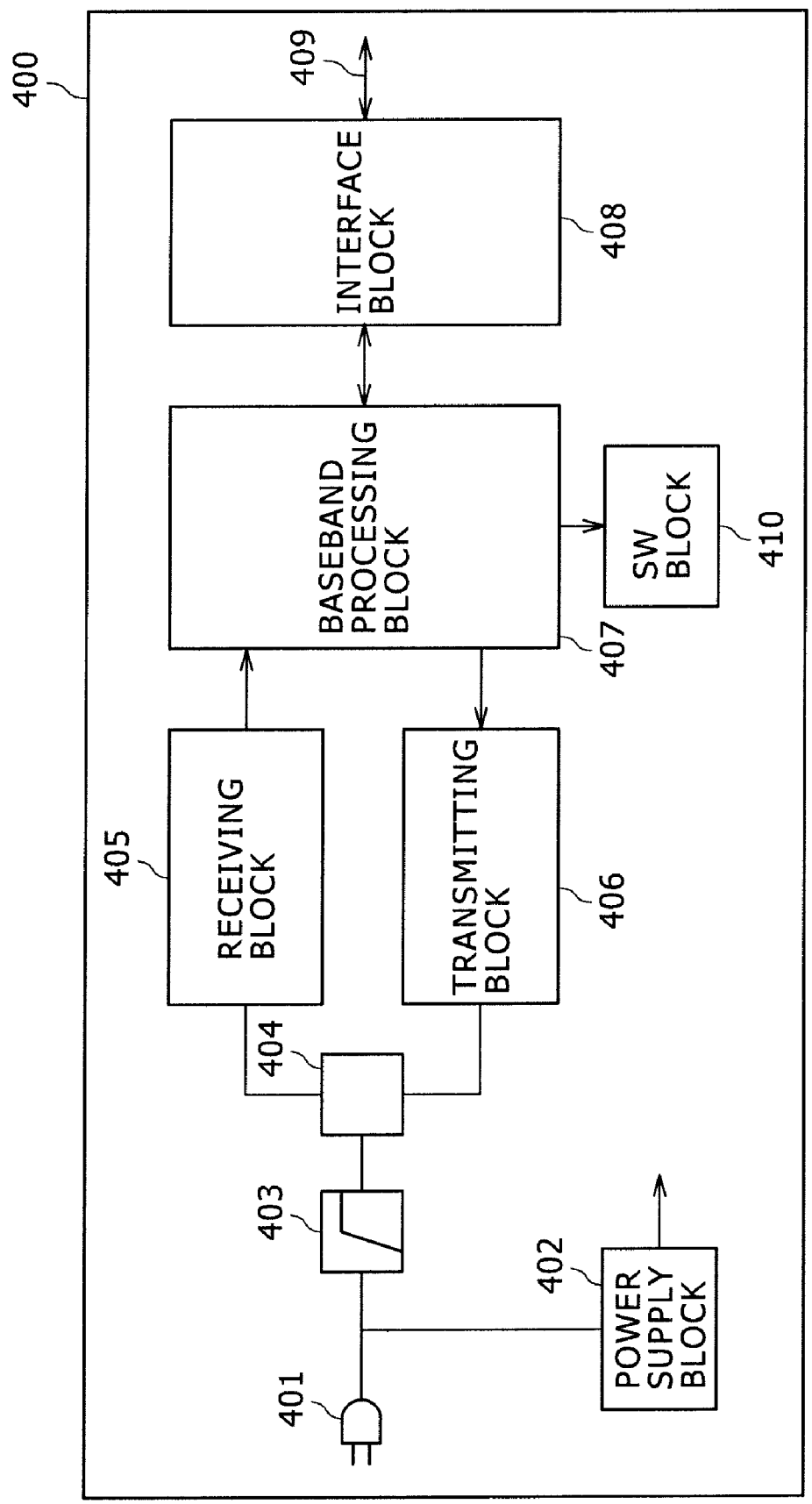
FIG. 4 is a schematic diagram illustrating an internal configuration of a PLC mode.

Referring to FIG. 4, there is shown an exemplary internal configuration of a PLC modem 400. The PLC modem 103 and the PLC modem 108 shown in FIG. 1 are equivalent to the PLC modem 400. Reference numeral 401 denotes an AC plug, reference numeral 402 denotes a power supply block for executing rectification and conversion from AC power to DC (Direct Current) power, reference numeral 403 denotes a highpass filter, reference numeral 404 denotes a coupling block for coupling transmission wave with reception wave, reference numeral 405 denotes a receiving block, reference numeral 406 denotes a transmitting block, and reference numeral 407 denotes a baseband processing block for executing OFDM modulation/demodulation processing and communication control. Reference numeral 408 denotes an interface block for providing an interface with Ethernet (registered trademark) for example.

A PLC signal received at the AC plug 401 is cut of the AC power supply component of 50 Hz to 60 Hz through the highpass filter 403, amplified by the receiving block 405 via the coupling block 404, and passed to the baseband processing block 407. The baseband processing block 407 executes AD conversion and then OFDM demodulation on the PLC signal, which is then converted into digital data.

Data from the Ethernet side is put into the baseband processing block 407 via the interface block 408 to be OFDM-modulated to provide a PLC signal, which is then passed to the transmitting block 406. The PLC signal amplified by the transmitting block 406 is multiplexed with an AC power supply signal via the coupling block 404 and the highpass filter 403 to be outputted from the AC plug 401 to the power line 100.

The baseband processing block 407 also executes MAC (Machine Access Control) such as framing, deframing, error detection, and retransmission.

The PLC modem 400 requires a master/slave relation and a user switches between master and slave through a switching block 410. The PLC modem that is the master station intermittently transmits beacon signals. On the other hand, on the basis of the beacon signals, the PLC mode that is the slave station can know whether communication is enabled or disabled and get various kinds of information. It should be noted that the master station is useful when QoS (Quality of Service) is required and the master/slave relation is not especially meaningful if two or more PLC modems are interconnected in an autonomously distributed manner.

Figure 5:
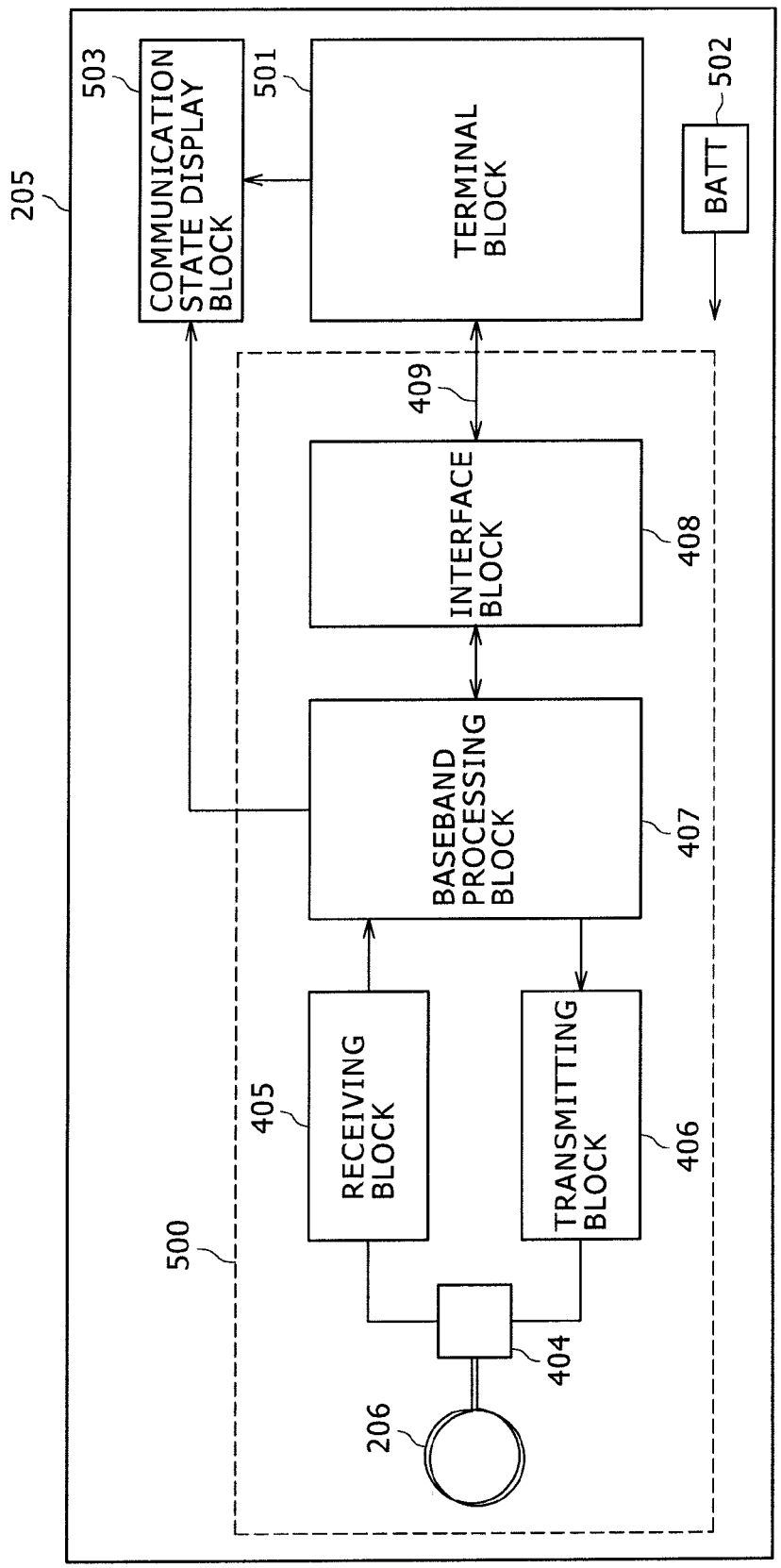
FIG. 5 is a schematic diagram illustrating an internal configuration of a PDA.

Referring to FIG. 5, there is shown an exemplary internal configuration of the PDA 205. In the figure, reference numeral 500 denotes a PLC modem block. The PLC modem block 500 may be either an internal module or card such as a compact flash memory.

Reference numeral 206 denotes a coil for electromagnetic coupling with the a coil 204 of the electromagnetic coupling sheet 202. Reference numeral 501 is a terminal block (the main body of the PDA). The configuration itself of the PDA main body is not directly related with the gist of the present invention, so that the description of the configuration of the PDA main is skipped. For interfacing between the PLC modem block 500 and the terminal block 501, bus connection is used if the PLC modem block is incorporated or compact flash interface if the PLC modem block is an externally attached card. Reference numeral 502 denotes a battery block and reference numeral 503 denotes a display block configured to display a communication state through LED (Light Emitting Diode).

A PLC signal received by the coil 206 is amplified in the receiving block 405 via the coupling block 404 to be passed to the baseband processing block 407. In the baseband processing block 407, PLC signal is AD-converted to be OFDM-demodulated to be converted into digital data.

On the other hand, the data from the terminal block 501 is put in the baseband processing block 407 via the interface block 408 to be OFDM-modulated. After DA conversion, the data becomes a PLC signal to be passed to the transmitting block 406. The PLC signal amplified by the transmitting block 406 is transmitted from the coil 206 via the coupling block 404 to the coil 204 of the electromagnetic coupling sheet 202 as an electromagnetic wave.

The baseband processing block 407 also executes MAC processing such as framing, deframing, error detection, and retransmission. The display block 503 shows, for the user, a communication state based on a reception level and the number of successful received packets by means of colors or blinking frequency.

Figure 6:
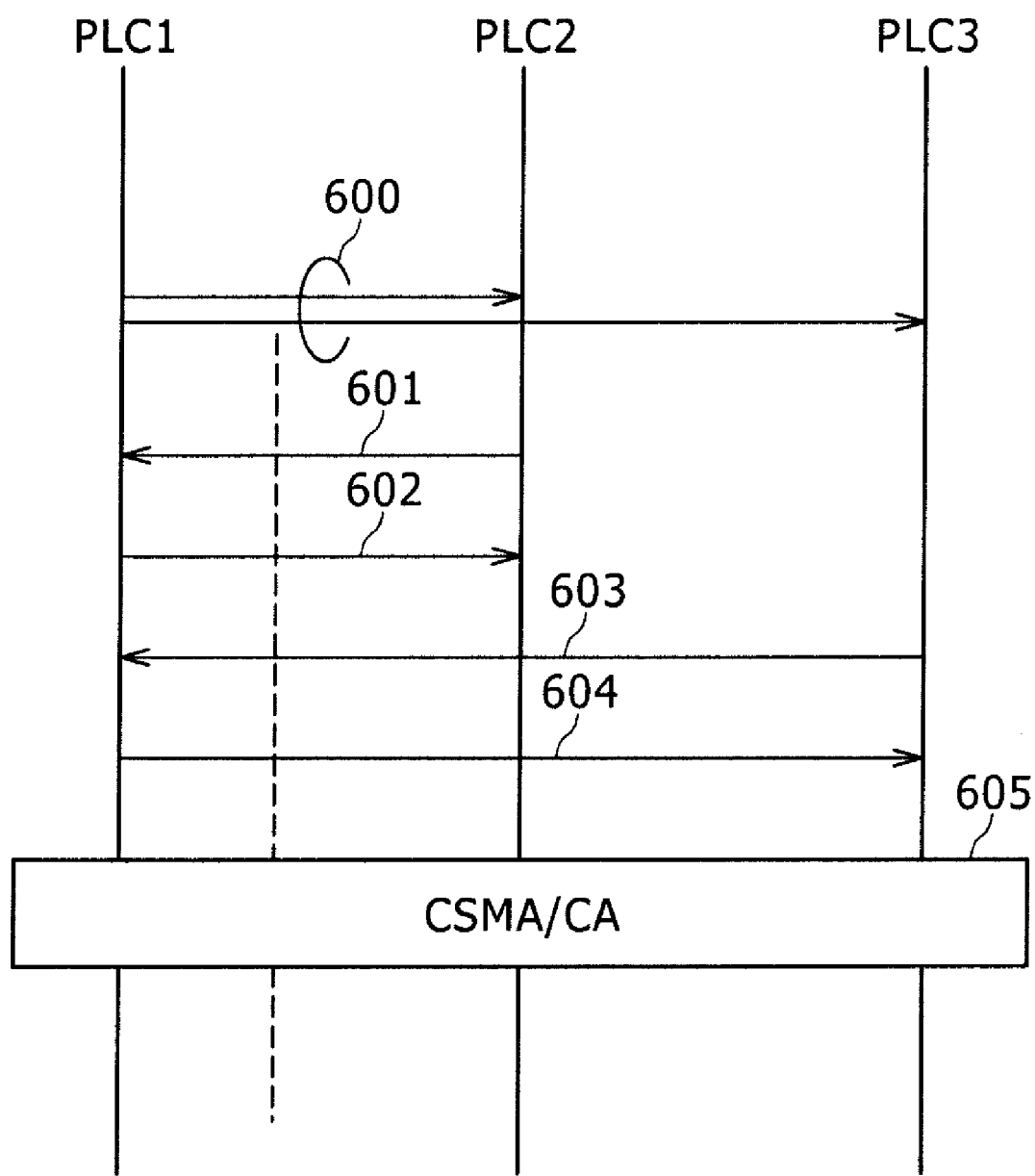
FIG. 6 is a diagram illustrating a communication procedure of PLC.

Referring to FIG. 6, there is shown a PLC communication procedure. With the communication procedure shown, a master/slave relation is set between PLCs; PLC1 is the master, PLC2 is a slave, and PLC3 is another slave, thereby replacing the PDA 205.

The PLC1 intermittently transmits a beacon signal 600. Although not shown in the figure, the PLC1 keeps transmitting the beacon signal in the subsequent transmission.

Receiving the beacon signal, the PLC2 transmits an entry signal 601 to the PLC1 and receives a permission signal 602 from the PLC1. The PLC3, as a slave, also executes substantially the same sequence as that of the PLC2 as denoted by reference numerals 603, 604.

When the above-mentioned sequence has been completed, the communication is ready any time in a connectionless manner. Namely, CSMA/CA (Carrier Sense Multiple Access with Collision Avoidance) allows mutual communication between the PLC1, PLC2, and PLC3.

However, the PLC2 and the PLC3 that are slaves must always receive the beacon signal of the master PLC1.

It should be noted that, with the communication procedure shown in FIG. 6, each data communication division is controlled by the master PLC1 in a centralized control manner in the case of an application that requires QoS such as streaming data although it is best-effort data.

For a communication standard based on PLC, HD-PLC (High Definition Power Line Communication) based on Wavelet-OFDM is known; however, the gist of the present invention is not limited thereto.

As described above, according to the communication system shown in FIG. 1, connecting a coupling device as shown in FIG. 3 to a power line increases the freedom of a location in which the PDA 205 is installed. However, the directivity inherent to the coil presents a problem of limited freedom in installation location.

Figure 7:
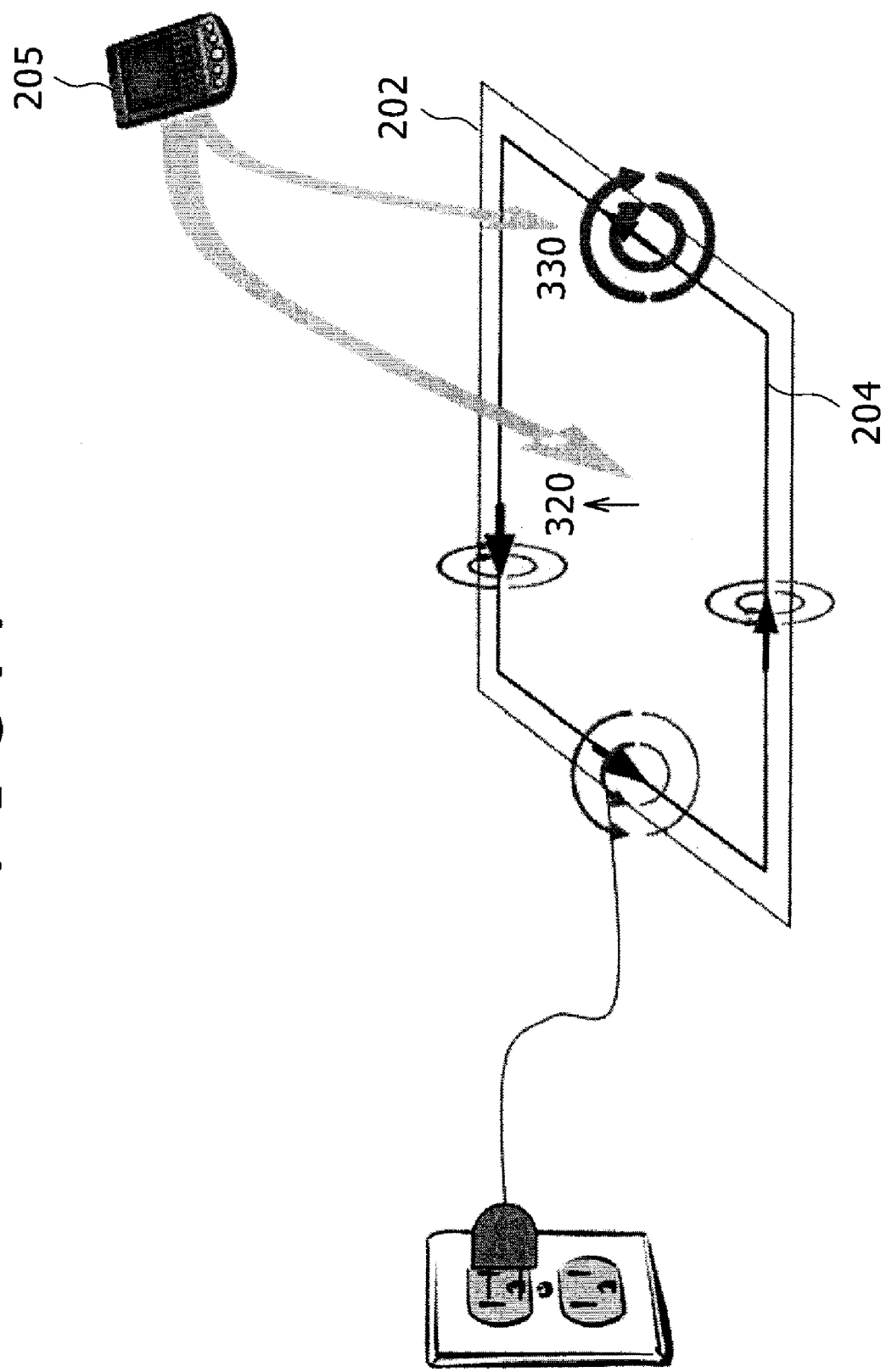
FIG. 7 is diagram illustrating directions of magnetic generated from the electromagnetic coupling sheet.

The coil has directivity and a highest electromotive force occurs when the magnetic field direction passes in the coil. FIG. 7 shows the directions of magnetic fields generated from the electromagnetic coupling sheet 202. A signal from a power line communication device such as the PDA 205 flows to the coil 204 arranged inside the electromagnetic coupling sheet 202, thereby generating a magnetic field. For example, at the center of the electromagnetic coupling sheet 202 (the coil 204), a magnetic field of vertical direction 320 relative to the electromagnetic coupling sheet 202 is provided, following so-called "right-handed screw rule" 330, depending upon the direction of flowing current on the coil wire. Hence, depending upon where to arrange the PDA 205 on the electromagnetic coupling sheet 202, the degree of electromagnetic coupling varies, resulting in deterioration of communication quality.

Therefore, in the present embodiment, the PDA 205 has two or more coupling coils having different winding directions (namely, directivities) and, when executing communication by bringing the PDA 205 to the proximity of the electromagnetic coupling sheet 202, selectively uses any one of the coils that comes to have a high degree of electromagnetic coupling with the electromagnetic coupling sheet 202 thereby providing the fastest communication speed. Consequently, in executing power line communication, the lowering of communication performance can be minimized and the degree of the freedom in the arrangement of the PDA 205 relative to the electromagnetic coupling sheet 202 can be enhanced.

Figure 8:
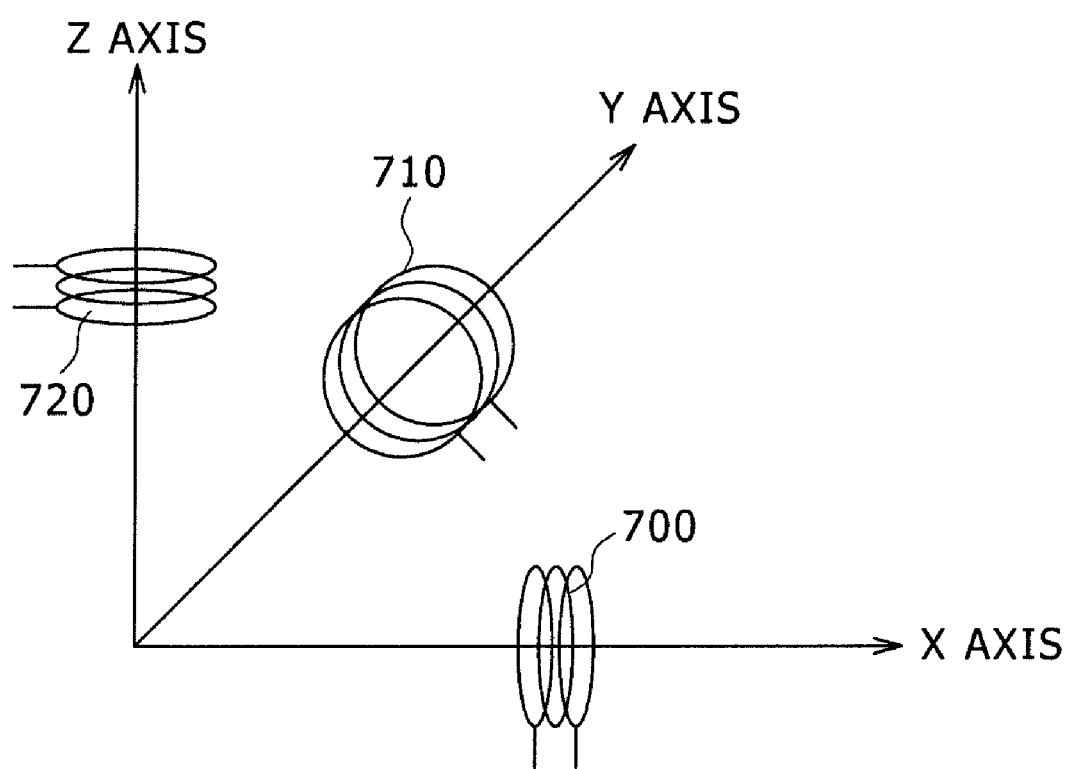
FIG. 8 is a diagram illustrating a manner in which coupling coils are arranged along X, Y, and Z axes.

With respect to the number of coupling coils to be provided on each mobile device and the arrangement of these coils, the arrangement of many coils in different directions can also provide an effect of enhancing the degree of freedom in arrangement. However, as shown in FIG. 8, arranging at least three coupling coils 700, 710, and 720 along X, Y, and Z axes such that the winding directions (namely, directivities) thereof orthogonally cross each other basically permits the coping with any directions of magnetic fields, thereby providing desired effects with efficiency.

Figure 9:
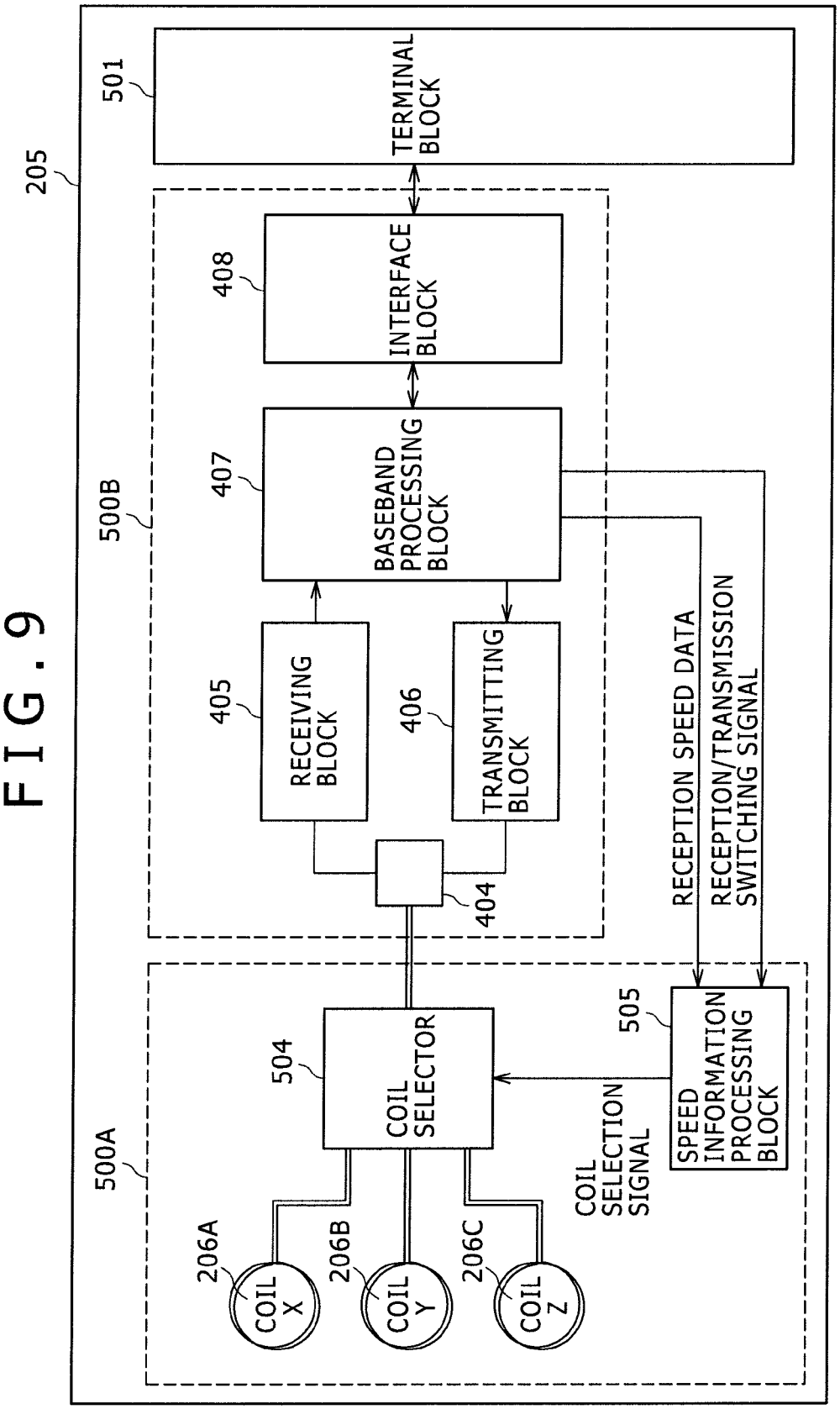
FIG. 9 is a schematic diagram illustrating an internal configuration of the PDA having three coils arranged in different winding directions (namely, directivities)

Referring to FIG. 9, there is schematically shown an exemplary internal configuration of the PDA 205 having three coils 206A, 206B, and 206C arranged such that the winding directions (namely, directivities) thereof are different from each other. However, components similar to those previously described with reference to the PDA 205 shown in FIG. 5 are demoted by the same reference numerals and the description thereof will be skipped.

A PLC modem block of the PDA 205 shown in FIG. 9 is made up of a coil switching block 500A and a PLC model block 500B.

The coils 206A, 206B, and 206C are arranged along X-axis, Y-axis, and Z-axis, respectively, as shown in FIG. 7 and, at the time of transmission or reception, communication is executed via any one of the coils 206A, 206B, and 206C. A signal from a power line communication device is received by the electromagnetic induction caused between the coil 204 in the electromagnetic coupling sheet 202 and the coil 206A, 206B, or 206C to be transmitted to a coil selector 504 arranged thereafter.

One of the signals received by the three coils 206A, 206B, and 206C is selected by the coil selector 504 in accordance with a coil switching signal to be led to a coupling block 404 in the PLC modem block 500B. This coupling block 404 connects the coil switching block 500A to a receiving block 405 at reception and to a transmitting block 406 at transmission.

The reception signal transmitted to the receiving block 405 via the coupling block 404 is cut of an unnecessary component outside the band to be amplified to a proper level, the amplified signal being outputted to a baseband processing block 407 in the stage thereafter. The baseband processing block 407 OFDM-demodulates the reception signal, the demodulated signal being transmitted to a terminal block 501 via an interface block 408 in the stage thereafter to be processed in accordance with the type of data.

On the other hand, at the time of transmission, the transmission data is transmitted from the terminal block 501 to the baseband processing block 407 via the interface block 408 to be OFDM-modulated. Next, the signal is amplified in the transmitting block 406 and the amplified signal is transmitted from one of the coils 206A, 206B, and 206C via the coil selector 504 controlled by a coil switching signal.

With respect to the switching between the coils 206A, 206B, and 206C, the PDA 205 is first placed on the electromagnetic coupling sheet 202, communication starts when a beacon signal is received from a power line communication device that is the master and the coil 206A is selected by the coil selector 504 as an initial value. The received signal is then OFDM-demodulated by the baseband processing block 407 and, at the same time, the reception speed is obtained to be transmitted to a speed information processing block 505 as reception speed data. Also, the baseband processing block 407 outputs a transmission/reception switching signal that is a signal for switching between transmission and reception to the speed information processing block 505.

In the baseband processing block 407, the reception speed at the time of the reception of a signal by each of coils 206A, 206B, and 206C can be identified on the basis of at least one of reception signal strength for AGC (Automatic Gain Control), BER (Bit Error Ratio), and reception quality. In a communication system based on OFDM modulating as with the present embodiment, the reception speed can be measured by use of a pilot signal that is inserted between information signals.

The speed information processing block 505 has a function of storing reception speed data entered on a packet basis, a function of selecting one of the three coils 206A, 206B, and 206C by controlling the coil selector 504, and a function of comparing reception speeds.

Figure 10:
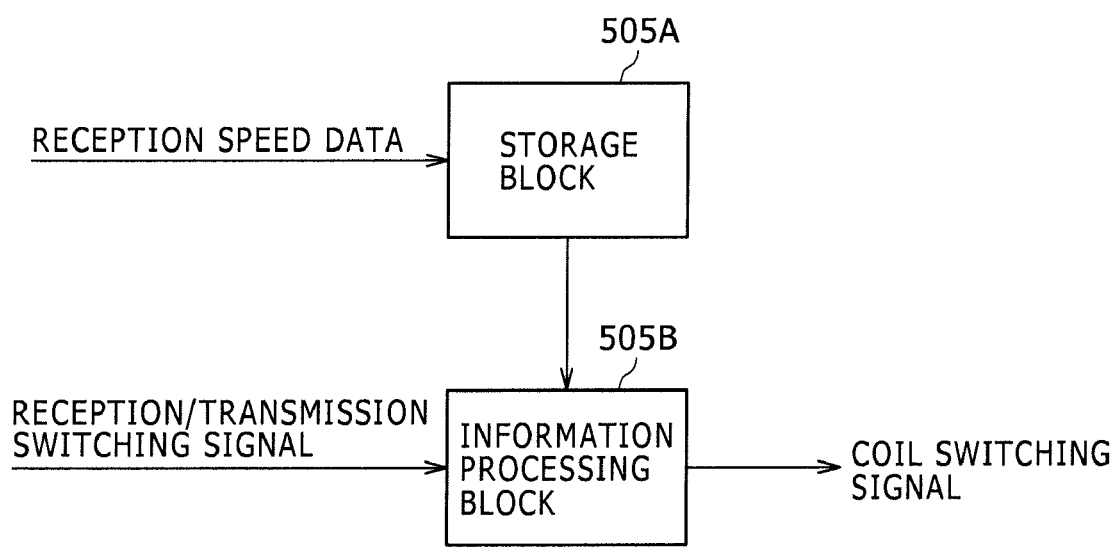
FIG. 10 is a schematic diagram illustrating an internal configuration of a speed information processing block.

Referring to FIG. 10, there is schematically shown an exemplary internal configuration of the speed information processing block 505. A speed information processing block 505 shown is made up of a storage block 505A and an information processing block 505B.

At the time of starting communication, a scan operation is executed to get the reception speed data of each of the coils 206A, 206B, and 206C. As an initial value, the coil 206A is selected by the coil selector 504. When the entered packet-basis reception speed data comes from the baseband processing block 407, the received reception speed data is stored in the storage block 505A along with the information about the selected coil 206A. The information processing block 505B selects the coil 206B by a coil switching signal when a next packet comes and stores the reception speed data transmitted from the baseband processing block 407 into the storage block 505A. Then, the information processing block 505B selects the coil 206C in the same manner and stores the reception speed data thereof into the storage block 505A.

Next, the information processing block 505B compares the reception speed data of the coils 206A, 206B, and 206C with each other to select the fastest coil and determines whether any of the speeds of the coils exceeds a predetermined speed level. If any of the speeds of the coils is found exceeding a predetermined speed level, the coil having the exceeding speed is selected by the coil selection signal.

If the coil selected as fastest does not exceed a predetermined speed level, the above-mentioned sequence is repeated for scanning and coil selection.

In order to prevent the switching during transmission or reception with respect to the switching timing in the coil selector 504, the coil switching is executed during the interval from transmission to reception by a transmission/reception switching signal.

In the subsequent communication period, packet-basis reception speed data is kept transmitted from the baseband processing block 407 to the speed information processing block 505. The information processing block 505B monitors the reception speed to determine whether the reception speed exceeds or does not exceed a predetermined speed level. When the reception speed is found to be equal to or lower than a predetermined speed level, the above-mentioned procedure is repeated with respect to the same scanning and coil selection as at the starting of communication. Consequently, the communication quality can be maintained above a certain level over the entire communication period.

Figure 11:
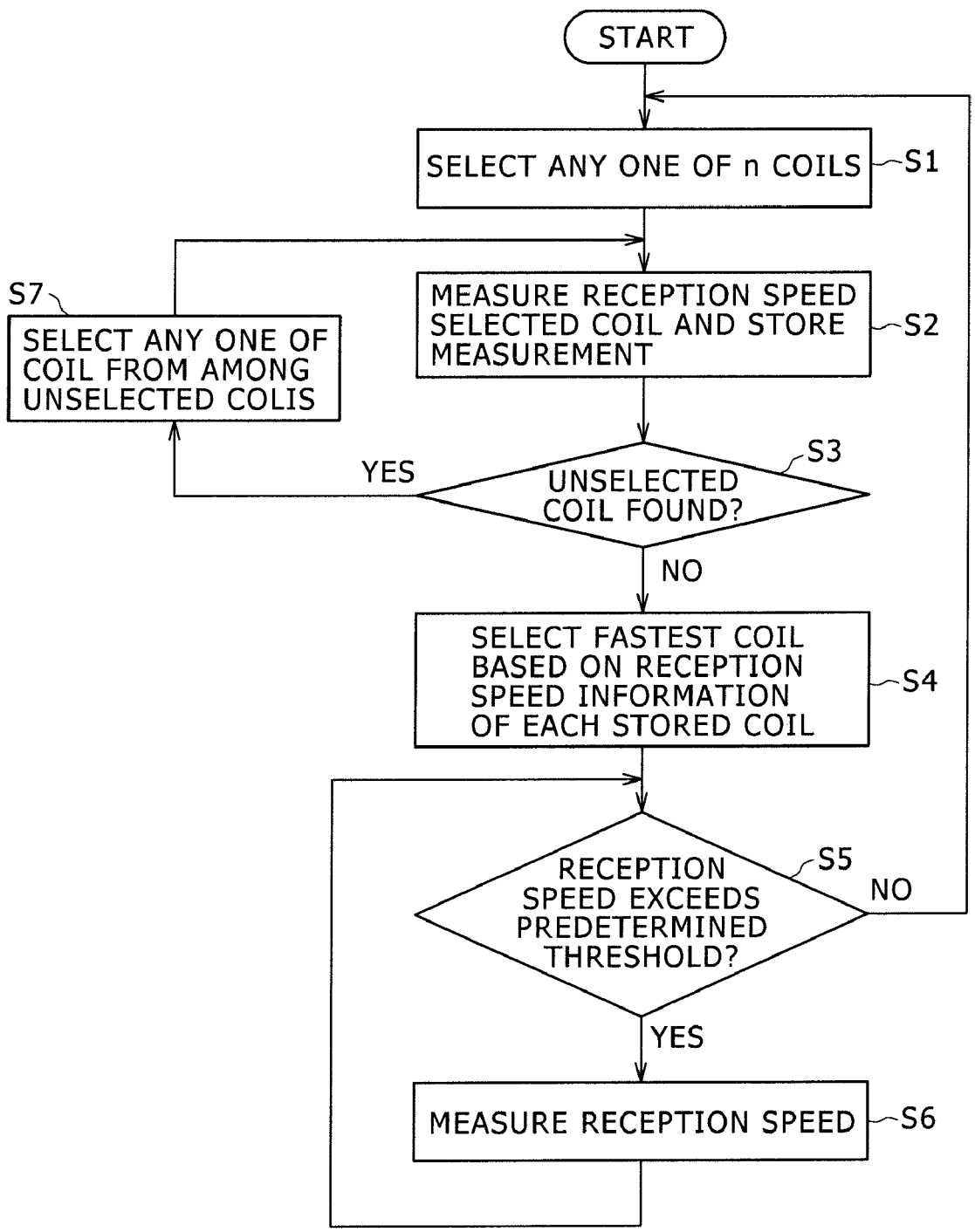
FIG. 11 is a flowchart indicative of a processing procedure of coil switching in a mobile device.

Referring to FIG. 11, there is shown a flowchart indicative of a processing procedure for coil selection in a mobile device. It should be noted that, in FIG. 11, the mobile device has n coils (n being an integer of 2 or higher) for the purpose of describing a general procedure. This processing procedure starts when the mobile device 205 is placed on the electromagnetic coupling sheet 202 and becomes ready for reception.

First, the speed information processing block 505 selects one of n coils 206-1 to 206-$n$ and outputs a coil switching signal to the coil selector 504 (step S1).

Next, signal reception processing is executed in the coil selected in step S1. The baseband processing block 407 outputs the reception speed data obtained by this reception processing to the speed information processing block 505. In the speed information processing block 505, the reception speed data is stored in the storage block 505A along with the information about the selected coil (step S2).

If there is any coil not yet selected (Yes in step S3), then one of the unselected coils is selected (step S7), upon which the procedure returns to step S2 to get the reception speed data in the same manner as above.

When the storage of the reception speed data of all coils has been completed (No in step S3), the information processing block 505B selects the fastest one of the reception speed data of all coils stored in the storage block 505A (step S4).

Next, the information processing block 505B determines whether the reception speed of the coil selected as the fastest exceeds a preset threshold value or not (step S5).

If the coil selected as the fastest is found not to exceed a preset threshold value in the reception speed (No in step S5), then the procedure returns to step S1 to repeat the above-mentioned procedure of the same scanning and coil selection as above.

On the other hand, if the reception speed of the coil selected as the fastest is found higher than a threshold value (Yes in step S5), then the information processing block 505B outputs a coil switching signal to the coil selector 504 and executes a communication operation after coil switching.

Also during a subsequent communication period, the reception speed data on a packet basis is kept transmitted from the baseband processing block 407 to the speed information processing block 505 and the information processing block 505B monitors the reception speed (step S6). Next, when the reception speed by the selected coil gets below the threshold value (No in step S5), the procedure returns to step S1 to repeat the above-mentioned procedure of the same scanning and coil selection as those at the starting of communication.

While preferred embodiments of the present invention have been described using specific terms, such description is for illustrative purpose only, and it is to be understood that changes and variations may be made without departing from the spirit or scope of the following claims.

Herein, embodiments of the present invention have been described as the coupling based on magnetic field between a mobile device and an electromagnetic coupling sheet. Because it can be considered that an electric field is also acting in no small measure, the gist of the present invention is not always limited to electromagnetic coupling.

In effect, the present invention has been disclosed in the form of embodiments, so that the descriptive contents hereof shall not be interpreted in a limited manner. In order to judge the gist of the present invention, the scope of claims hereof must be taken into consideration.

What is claimed is:

1. A communication system comprising:
    at least one power line communication apparatus connected via a general power line for supplying a commercial alternate current power;
    a communication terminal having
        a modem for power line communication, and
        a plurality of first coils having different directivities; and
    a coupling apparatus, connected to a power line, having
        a filter for attenuating an alternate current component of the power line, and
        a second coil arranged after the filter;
    wherein the communication terminal executes mutual communication with any of the power line communication apparatus connected via the general power line through proximity communication based on an electromagnetic coupling action that is generated between at least one of the plurality of first coils and the second coil when the communication terminal is brought to the proximity of a coupling surface of the coupling apparatus.

2. The communication system according to claim 1, wherein the communication terminal has three first coils having directivities along orthogonally crossing X, Y, and Z axes.

3. The communication system according to claim 1, wherein, in executing communication by bringing the communication terminal to the proximity of the coupling apparatus, the communication terminal selectively uses any one of the plurality of first coils that is highest in a degree of electromagnetic coupling with the second coil of the coupling apparatus and highest in communication speed.

4. The communication system according to claim 1, wherein, in starting communication with any one of the power line communication apparatus connected via a general power line, the communication terminal switches between the plurality of first coils to obtain a reception speed at which a signal is received by each coil and makes a comparison between the reception speeds of the plurality of first coils, thereby selecting the coil of the fastest speed.

5. The communication system according to claim 1, in starting communication with any of the power line apparatus connected via a general power line, the communication terminal switches between the plurality of first coils to execute a scan operation for obtaining a reception speed at which a signal is received by each coil and selects any one coil that is highest in reception speed and this reception speed exceeds a predetermined speed, and
    during communication, when the reception speed of the selected coil becomes equal to or below the predetermined speed, executes the scan operation again, thereby selecting any one coil that is highest in reception speed and exceeds the predetermined speed.

6. The communication system according to claim 3, wherein the communication terminal executes the coil switching in an interval where transmission is switched to reception.

7. The communication system according to claim 3, wherein the communication terminal identifies the reception speed on the basis of at least one of reception signal strength for automatic gain control, bit error ratio, and reception quality that are obtained in baseband processing of a reception signal of the first coil.

8. The communication system according to claim 1, wherein the coupling apparatus has:
    means for connection to the general power line;
    a filter for attenuating an alternate current component of the general power line; and
    a coil arranged after the filter.

9. The communication system according to claim 8, wherein the filter is a highpass filter that cuts an alternate current component of 50 Hz to 60 Hz.

10. The communication system according to claim 8, wherein the filter is a highpass filter is made up of a transformer, one end thereof being connected to the filter and another end being connected to the general power line via a pair of capacitors.

11. A communication apparatus comprising:
a modem for power line communication;
a plurality of first coils having different directivities; and
coil switching means for selecting any one of the plurality of first coils for transferring, with outside, a power line communication signal by electromagnetic coupling;
wherein the communication apparatus participates in power line communication as a communication terminal in a communication system having at least one power line communication apparatus connected via a general power line for supplying a commercial alternate current power; and the communication system including a coupling apparatus, connected to a power line, having a filter for attenuating an alternate current component of the power line and a second coil arranged after the filter; the communication terminal executing mutual communication with any of the power line communication apparatus connected via the general power line through proximity communication based on an electromagnetic coupling action that is generated between at least one of the plurality of first coils and the second coil when the communication terminal is brought to the proximity of a coupling surface of the coupling apparatus.

12. The communication apparatus according to claim 11, wherein, in transferring a power line communication signal with outside by electromagnetic coupling, the coil switching means selectively uses any one of the plurality of first coils that is highest in communication speed.

13. The communication apparatus according to claim 11, wherein, in starting communication with any one of the power line communication apparatus connected via the general power line, the coil switching means switches between the plurality of first coils to obtain a reception speed at which a signal is received by each coil and makes a comparison between reception speeds of the plurality of first coils to select the coil that is highest in reception speed.

14. The communication apparatus according to claim 11, wherein, in starting communication with any one of the power line communication apparatus connected via the general power line, the coil switching means switches between the first coils to execute a scan operation for obtaining a reception speed at which a signal is received by each coil and selects any one coil that is highest in reception speed and this reception speed exceeds a predetermined speed, and
during communication, when the reception speed of the selected coil is equal to or below the predetermined speed, executes the scan operation again, thereby selecting any one coil that is highest in reception speed and exceeds the predetermined speed.

15. The communication apparatus according to claim 12, wherein the coil switching means executes the coil switching in an interval where transmission is switched to reception.

16. The communication apparatus according to claim 12, wherein the coil switching means identifies the reception speed on the basis of at least one of reception signal strength for automatic gain control, bit error ratio, and reception quality that are obtained in baseband processing of a reception signal of the first coil.

* * * * *